United States Patent [19]

Zorbalas

[11] Patent Number: 4,471,392
[45] Date of Patent: Sep. 11, 1984

[54] AUTOMATIC SCAN TRACKING WITH RINGING CONTROL

[75] Inventor: George S. Zorbalas, Cherry Hill, N.J.

[73] Assignee: RCA Corporation, New York, N.Y.

[21] Appl. No.: 363,802

[22] Filed: Mar. 31, 1982

[51] Int. Cl.³ .............................................. G11B 5/58
[52] U.S. Cl. ..................................... 360/77; 360/10.2
[58] Field of Search .................... 360/10.2, 70, 75, 76, 360/77, 78

[56] References Cited

U.S. PATENT DOCUMENTS 4,080,636 3/1978 Ravizza ................................ 360/77

Primary Examiner—George G. Stellar
Attorney, Agent, or Firm—E. M. Whitacre; W. H. Meise

[57] ABSTRACT

A dithered automatic scan tracking system for a videotape playback machine includes a bimorph which with its associated load has a mechanical resonance. In special-effects operating modes, the jump or reset signal which drives the bimorph at the end of its scan to position the playback transducer for the next track excites the mechanical resonance, which causes incorrect demodulation of the detected FM envelope and therefore causes generation of an incorrect AST loop error signal until the excited resonance dies away. A gated phase-lock loop is coupled to the bimorph position sensor and produces clock signals for control of the demodulation of the detected FM envelope. The gate decouples the position sensor from the phase-lock loop during recurrent intervals including those intervals during which the mechanical resonance is excited. This allows generation of a correct error signal immediately after the jump and reduces mistracking.

1 Claim, 12 Drawing Figures

AUTOMATIC SCAN TRACKING WITH RINGING CONTROL

BACKGROUND OF THE INVENTION

This invention relates to an automatic scan tracking system (AST) for a helical-scan VTR (video tape recorder) which has a gated phase-lock loop for generating the clock signal for the mistrackingigh transducer-to-tape velocity for good frequency response. Each scan of a head across the slowly moving tape is almost longitudinal. The recorded tape includes a succession of closely spaced recorded tracks. Ordinarily, each scan of a track by a transducer occurs in a time substantially equal to a television field (262 ½ horizontal lines). In order to obtain high information density on the tape, the recorded tracks are closely spaced and narrow in width. Reproduction of video signals from such a helically-scanned recorded tape requires that the playback transducer closely follow the recorded track. The width of the playback transducer cannot be made much larger than the width of the recorded track, for otherwise mistracking might result in picking up signals from an adjacent track. Due to the mechanical tolerances from tape to tape and between the various recorders and playback machines, and also due to stretching of the tape due to variations in temperature, tension and the like, mistracking of the recorded track by the playback head may occur, with the result that signals from adjacent tracks may be picked up by the playback transducer and thereby increase the noise level of the desired signal, or in extreme cases the head may completely leave the desired track and respond to an adjacent track.

In the prior-art video tape playback arrangement of FIG. 1, a tape (not shown) which is omega-wrapped about a headwheel (also not shown) is drawn past a playback transducing head 10 attached by a mounting 12 to a piezoelectric bimorph element 14. The bimorph element is adapted for moving the playback head in a direction transverse to the direction of relative motion between the transducer and the tape, which is a direction generally perpendicular to the length of the recorded track. The head, mounting and bimorph are mounted on a headwheel (not shown) for rotation therewith so as to provide a high head-to-tape speed necessary for reproduction of video. A sinusoidal signal is applied from dither generator 48 to bimorph 14 in order to cause the playback head to move back and forth transversely as it sweeps along the recorded track, as illustrated in FIG. 2. This oscillation or dither causes the playback head to mistrack slightly to the right and to the left of the track as viewed along the track, so that the playback head partially overlies the guardbands between tracks. This has the effect of reducing the amplitude of the transduced FM carrier during those intervals in which the head partially overlies the recorded track and partially overlies the guardband. The transduced playback signal includes a carrier which is frequency-modulated with the recorded information and which is also modulated in amplitude by the effect of the dither. As transducer 10 scans a recorded track on the tape, the transduced frequency-modulated (FM) signals are coupled to the input of an FM preamplifier 18 which amplifies the signals and applies them to a playback amplifier and equalizer illustrated as a block 20. The equalized FM signals are applied to an FM demodulator 22 for demodulation of the video signals modulated onto the FM carrier. So long as the dither amplitude is not excessive, the amplitude of the FM carrier will not decrease to an extent which introduces noise into the recorded information. The information can thus be recovered by a conventional FM demodulator including a limiting amplifier (not shown) for limiting the carrier to strip the amplitude modulation therefrom, together with a conventional frequency demodulator for recovering the information signal. The demodulated video is applied to a sync separator 24 and to a utilizing apparatus (not shown). The equalized FM signal from equalizer 20 is also applied to a sensing arrangement designated generally as 26 which includes an AM envelope detector 28 which detects the variations in the amplitude of the FM signal. The demodulated envelope information is applied to a sample-and-hold circuit 30 which is keyed by a tape horizontal sync pulse extracted from the video information by separator 24. Since the sync tip, as FM modulated, always represents the same FM carrier frequency, sampling of the envelope of the FM carrier during the sync tip guarantees that the amplitude of the envelope is not affected by frequency-dependent amplitude characteristics of the transducer, preamp or equalizer. The sampled signal is applied to a band-reject filter 32 for purposes to be described. The filtered signal is applied to an input terminal of a synchronous detector 34. The strain gauge illustrated as 16 is physically coupled to the bimorph element and is arranged to produce signals representative of the deflection of the bimorph and therefore of the position of transducer 10. The other input to synchronous detector 34 is the signal from strain gauge 16, amplified and limited by an amplifier 36 and zero crossing detector 38. The synchronously detected amplitude modulation of the FM carrier appearing at the output of detector 34 is applied through a second band-reject filter 40 and an amplifier and phase compensator (APC) 42 to an integrator 44. It is found that when the playback transducing head scans a path centered upon the recorded track, with the dither excursions being approximately symmetrical, that the principal component of the detected amplitude modulation is at twice the dither oscillator frequency, whereas if the scan of the playback head is centered along a path removed from the center of the recorded track, the recovered amplitude modulation includes components at the dither oscillator frequency. The phase of the recovered amplitude modulation relative to the dither oscillator signal depends upon whether the mistracking is to the right or to the left of the recorded track, viewed in the direction of the scanning path. Integrator 44 filters the error signal before applying it to an adder 46 for combination with the dither signal of frequency $F_d$. The combined dither and integrated signal is applied through a drive amplifier 50 to bimorph element 14 for deflection thereof by the sum of the error signal and the dither signal. In FIG. 2a, a portion of recorded track 50 is illustrated, together with the sinuous path, illustrated by a number of vertical lines, representing the various positions taken by the gap of the playback head as it is dithered by the combined drive signal applied to bimorph 14 At times between T1 and T2, the bimorph is deflected to one extreme of its travel and line 52 which represents the physical position of the transducer gap at that instant completely overlies recorded track 50. Consequently, the playback transducer picks up maximum FM signal, and envelope detector 28 produces a signal such as that represented by waveform 54, having a maximum positive value in the interval T1–T2. Signal 54 has a fundamental component at dither frequency $F_d$ so is not affected by $2F_d$ reject filter 32. At a time midway between times T2 and T3, the playback head is in a position illustrated by line 56, which position is half on and half off the recorded track. The portion which is off the recorded track overlies a guardband and receives no signal. Consequently, the signal picked up by transducer 10 is at a minimum as illustrated by the minimum signal level of signal 54 in interval T2–T3. This pattern is repeated in intervals T3–T4 and T4–T5. It will be noted that as illustrated, the playback head scan path is offset to one side of recorded track 50. The limited strain gauge signal 58 is indicative of the direction of deflection of the bimorph element about its nominal position. Signal 60 represents the output signal of synchronous detector 34, which is the product of signals 54 and 58. In interval T1–T2, signal 58 is positive and signal 54 is also positive, and consequently the detected signal 60 in FIG. 2a also takes on a positive value. In interval T2–T3 signal 58 takes a negative excursion as does signal 4, and therefore the product is still positive. Thus, the unfiltered error signal takes on an appearance similar to voltage waveform 62 having an average positive value. This signal has a fundamental component at twice $F_d$, which is filtered by $2F_d$ filter 40. The positive value of the error signal 62 is filtered by integrator 44 and coupled to drive bimorph element 14 in a direction selected to urge the playback head scan path towards the center of recorded track 50 in a closed-loop feedback manner.

FIG. 2b illustrates recorded track 50 and a dithering playback head scan path illustrated as in FIG. 2a by vertical lines representing the instantaneous position of the playback head gap. As can be seen, mistracking in the case of FIG. 2b is to the opposite side of recorded track 50. Consequently, the interval T1–T2 in which the deflection of the bimorph drives the position of the transducing head in the direction shown relative to recorded track 50, the amplitude-demodulated FM signal 64 reaches a minimum value, rather than a maximum value as illustrated in the corresponding time interval in FIG. 2a. Signal 64 has only a dither-frequency component which is not affected by filter 32. Thus, it can be seen that the polarity of the amplitude-demodulated component of the transduced signal is opposite to that shown in FIG. 2a for mistracking of the opposite sense and also contains components at twice the dither frequency, so is filtered by filter 40. The product of waveforms 58 and 64 is principally negative-going as illustrated by waveform 66 of FIG. 2b, and the unfiltered error signal applied to integrator 14 takes on a negative value as illustrated by waveform 68. Thus, mistracking as illustrated in FIG. 2b results in an error signal of opposite polarity to that shown in FIG. 2a, and consequently the feedback loop urges the scan path towards the center of recorded track 50. FIG. 2c illustrates the situation which prevails when the scan path of the playback head is centered on recorded track 50. An amplitude-demodulated signal illustrated as signal waveform 70 is a double-rate signal by comparison with demodulated signals 64 or 54. The feedback loop may discriminate against these components, since they do not convey useful information as to mistracking. For this reason, the arrangement of FIG. 1 includes twice-dither frequency reject filters 32 and 40. The product of demodulated signal 70 and strain gauge signal 58 is illustrated as a waveform 72, which has a net value of zero, as suggested by line 74, representing a zero filtered output signal. With the head centered on the track, therefore, no error signal is generated and bimorph 14 remains in a relatively undeflected state.

If the playback machine is intended to play back tape moving only at the speed at which it was recorded, only a closed-loop dither automatic scan tracking (AST) system is necessary. Broadcast-quality tape recorder-playback machines are now provided with certain special effects capability, such as stop-motion and fast-forward playing speeds. The track as recorded on the tape is the product of two velocities; the velocity of the tape and the velocity of the headwheel. The normal tape velocity is aproximately one percent of the total head-to-head tape speed, and during the recording the tape motion during one recording transducer scan is an amount equal to one track width plus one guardband width.

FIG. 3a illustrates in developed view a portion of a tape 310 upon which are recorded tracks 314, 318, 322 and 327 separated by guardbands 316, 320, and 324. The path scanned by the recording head in the absence of tape motion is illustrated as dotted lines 305. The recording head started at the top of the tape by scanning a path 305, and the tape motion in the direction shown caused the scanning of recorded track 314. Thus, the tape motion during one scan at normal tape speed is one track width plus one guardband width. If head scanning path 305 represents the scanning path of a playback head while the tape is in motion at the normal speed, it can be seen that path 305 would overlie track 314, and in principle no correction would be required. As mentioned, it may nevertheless be desirable to use a closed-loop AST arrangement to make sure that the scanning path coincides with the recorded track. For stop-motion special-effects, the playback head must scan the same track repeatedly, and so the tape must be motionless. The playback head begins scanning of a track, but because of the absence of tape motion it would end its scan on an adjacent recorded track, but for the action of the automatic scan tracking system. In the absence of tape motion, the scanning path illustrated as 326 in FIG. 3b begins at the top of the tape on track 318 but in the absence of tape motion ends its scan substantially overlying recorded track 314. In the region designated as 328, the playback head would substantially overlie the guardband 316 and equal portions of track 314 and 318, and noise would result. Under this condition, the closed-loop AST circuit can correct. The correction required increases progressively during the scan from top to bottom; i.e. no correction is required at the top and therefore the loop error voltage is approximately zero whereas at the bottom of the scan an error voltage corresponding to a deflection of the bimorph of one track width plus one guardband width is required. Thus, the loop must correct for varying amounts of error during each scan of the playback heads across the tape. Closed-loop AST systems have a wide bandwidth for fast response. In the stop-motion mode, therefore, the bimorph must deflect gradually during the track scanning interval by an amount equal to one track width plus one guardband width. At the end of scan, however, the bimorph has applied to it a signal which is substantially a step-function in order to cause the bimorph to deflect back to its original position at the beginning of the scan. This is intended to return the playback head to its original position so that it can once again scan the same track. The return must be accomplished within the time of the gap between scans.

A similar effect occurs in the special-effects mode of double-speed viewing. In this mode, the speed of the tape is doubled from the normal speed or from the speed at which the recording was made. In this mode, every other track is scanned, with the result that the bimorph must jump forward by one track width plus one guardband width at the end of each scan, rather than a jump backwards by the same amount as in stop-motion. When fast-forward play is desired at speeds greater than twice the normal speed, the AST feedback loop is required to hold the playback head on the recorded track notwithstanding that in the absence of the AST system several recorded tracks would have passed under the playback head. It can readily be seen, therefore, that in extreme fast-forward playback modes, the deflection of the bimorph which supports the playback head may correspond to the distance between several tracks. Such special-effects modes of operation may create problems. For example, the large deflection in fast-forward modes may cause errors in tracking due to the limited loop gain and speed of the AST arrangement. Furthermore, at the end of a scan in which the bimorph is deflected by several track spacings, the head may start a new track with the bimorph already partially deflected, which may result in exceeding the physical deflection limits of the bimorph element.

A known arrangement for ameliorating the effects of special-effect modes of operation on the automatic scan tracking system involves the use of a tape speed detector for generating an analog signal representative of the tape speed and applying it together with the error signal output of the synchronous detector to the integrator of the AST loop. This results in the generation of a ramp signal at the output of the integrator which is summed with the dither signal for application to the bimorph. The ramp is part of an open-loop compensation which reduces the loop gain requirements on the closed-loop AST system because the bimorph is driven by a signal selected to position the playback head in approximately the correct place at the beginning of each scan.

FIG. 4 illustrates such a prior art arrangement for injecting an open-loop ramp compensation so as to reduce the mistracking for large bimorph deflections in cases where the tape playback speed is other than the recording speed. Those portions of FIG. 4 corresponding to elements of FIG. 1 are given the same reference numbers. Additional elements in FIG. 4 include a summing circuit 410 coupled between phase compensator 42 and integrator 44, a tape speed detector 412, an output of which is coupled to an input of summing circuit 410, and a ramp reset system 414 also having an output terminal coupled to an input terminal of summer 410. A crystal oscillator 416 provides a time reference for tape speed detector 412 and ramp reset 414.

Tape speed detector 412 receives tape horizontal sync pulses separated from the demodulated video by sync separator 24. A phase-locked oscillator 420 produces 2H pulses which periodically reset counter 422. Counter 422 is coupled to receive clock pulses from crystal oscillator 416. Tape speed is determined by counting the time between horizontal sync pulses derived from the tape. As mentioned, normal tape speed corresponds to about one percent of the head-to-tape velocity. A slowing down or stopping of the tape, therefore, can make as much as a one percent difference in the rate at which sync pulses are transduced from the tape. Tape speeds in excess of the normal tape speeds likewise affect the rate of the transduced tape sync pulses. The decoded output of counter 422 is therefore representative of tape speed. The decoded output is applied to a digital-to-analog converter 424 for conversion to an analog signal which is filtered by an low-pass filter 426 to form a substantially constant voltage representative of the instantaneous tape speed. An equally acceptable tape-speed signal generator is to decode the capstan tachometer, which also produces an analog signal indicative of tape speed. The analog speed voltage, however generated, is applied to an input of summing circuit 410 to be summed with the unfiltered loop error voltage from synchronous detector 34. The tape speed may be expected to remain constant over times as short as one scan of the tape by the head, and therefore the analog tape-speed voltage component of the signal applied to integrator 44 generates a ramp illustrated as 428. Ramp 428 is applied to summing circuit 46 and the dither is added thereto to form a dithered ramp signal illustrated as 430 which is applied to the bimorph element. The ramp component of the bimorph drive signal is an open-loop compensating voltage tending to cause the bimorph to deflect over the interval of one head scan of the tape by an amount corresponding to the expected average deviation as determined by the tape speed. The open-loop compensating ramp voltage applied to bimorph 14 causes it to deflect in a ramp-like manner and strain gauge 16 therefore produces as an output signal a dither signal superimposed upon a ramp, as illustrated by 432. Such a superposed ramp might adversely affect operation of zero-crossing detector 38. This effect is avoided by deriving a ramp sample 428 from the output of integrator 44 and applying it to an inverting input terminal of amplifier 36 to offset the ramp component of the input signal applied from the strain gauge to the noninverting input. Thus, only the dither signal appears at the input of zero-crossing detector 38, as before, and the open-loop ramp correction does not affect zero-crossing detector 38.

As mentioned, the tape speed remains approximately constant over the duration of one scan and in fact over the duration of several scans of the tape. Consequently, the analog tape speed signal applied from tape speed detector 412 to summing circuit 410, if continued, would cause the output signal of integrator 44 to grow without limit. The tape speed ramp-correction, therefore creates a condition in which there must be a reset of the ramp signal at the output of the integrator after the completion of each scan by the playback head, for the increasing ramp would cause a corresponding increase in the bimorph deflection. The reset is provided by a controllable reset current generator 434, the output of which is summed with the analog speed signal at the input to the integrator of the AST loop. Ramp reset circuit 414 includes a controllable signal source 434, the output of which is coupled to a further input of summing circuit 410. The reset current generator 434 is controlled to reset the integrator by an amount established by a jump decision logic circuit which in turn is controlled by the headwheel drum once-around signal, reference 2H signals and the clock signal from oscillator 416 to determine the phase of the vertical sync pulse from the tape by comparing its actual time of arrival with the time at which it would be expected to appear if the tape were moving at its normal speed. A logic circuit 436 chooses a preset magnitude of the reset ramp which is required to place the bimorph and its associated playback head on the desired track at the beginning of the next following scan. Signal generator 434 is enabled by the logic circuit and produces a signal the magnitude of which is established by the logic circuit. This large signal is applied to summer 410 for a short period of time, which resets integrator 44 as illustrated by sharply-changing portion 438 of ramp 428. The open-loop correction ramp therefore provides an open-loop correction which positions the bimorph and its associated playback head in the approximate location which is required to follow a recorded track for the particular tape speed at which playback occurs. The reset current generator moves the bimorph during the gap between scans to position the transducer at the appropriate track at the beginning of the next scan.

The bimorph, its mounting and the transducer together form a motor and load which are driven by an electrical signal. The bimorph is cantilevered; i.e., held at one end while the other end is free to move, carrying the transducer. Such a mechanical apparatus has a natural resonance frequency, which is the frequency of oscillation in response to an impulse driving function, whether the driving function be mechanical or electrical. A plot 500 of mechanical amplitude response or deflection as a function of a constant-amplitude electrical drive signals for a typical piezoelectric bimorph is illustrated in FIG. 5a. The particular element illustrated has an amplitude response up to about 500 Hz which is proportional to the amplitude of the electrical driving function. The amplitude of the mechanical vibration increases to a maximum near 1000 Hz, when the electrical driving function is near a natural mechanical resonance of the structure (sometimes called an anti-resonant point). Between 1000 Hz and 1500 Hz, the amplitude dips some what, and above 1500 Hz the amount of motion decreases with increasing frequency. Other minor resonances may occur. Individual bimorph elements made in the same manner show sample-to-sample variations in the exact shape of the response curve, with primary resonant frequencies which may vary by as much as 2:1. As is known to those skilled in the art, such resonant response curves are associated with changes in the phase of the mechanical response relative to the electrical driving function. In order to provide adequate scan tracking capability for special-effects modes of operation, the frequency response of the automatic scan tracking system should exceed 500 Hz, and it would be preferable to have a frequency response in excess of 1000 Hz, which would allow a wider range of fast-motion special effects.

A known arrangement for ameliorating the effects of mechanical resonance of the bimorph and its associated structure is described in U.S. Pat. No. 4,080,636 issued Mar. 21, 1978 in the name of Ravizza. In this arrangement, a transducer responsive to the deflection of the bimorph generates an electrical signal indicative of the instantaneous deflection velocity of the transducer. A feedback system converts the velocity information into an electrical damping signal and applies the damping signal as a supplemental drive to the deflectable member.

Another known arrangement for reducing the effects of mechanical resonance of the bimorph uses mechanical elements for the bimorph, its support and load which are selected to be lightweight and of low loss to raise the first resonant frequency and the Q of that resonance, as illustrated by response curve 510 in FIG. 5b. In this arrangement, the mechanical resonance is near 1200 Hz, but the Q is greater, thereby providing a relatively linear response (mechanical amplitude response proportional to and in-phase with the electrical drive) up to nearly 1000 Hz. As a further aid in reducing unwanted mechanical resonances in this arrangement, the high-frequency components of the electrical drive or forcing function, which are the track jumps, are selected in the form of recurrent pulses of duration tau ($\tau$) as illustrated by waveform 514 of FIG. 5c, which have an amplitude-frequency spectral distribution such as that illustrated in FIG. 5d. In FIG. 5d, the distribution consists of a large number of spectral lines 516 spaced in frequency by an amount equal to the reciprocal 1/p of the interpulse duration p. For a playback videotape machine having a headwheel rotational velocity of 60 Hz, the interval between track jumps is about 16.7 milliseconds, and the spectral lines 516 are spaced at 60 Hz intervals. The pulse duration $\tau$ is selected near 800 $\mu$S to make the null in the spectral energy distribution fall near 1200 Hz, so that little drive energy is applied to the bimorph element near its mechanical resonance frequency, and therefore the amount of undesired deflection due to the resonance is reduced and the mechanical response more closely conforms with the electrical drive signal. It has been found to be advantageous to couple the jump signal pulse to the bimorph by way of the loop integrator, however, and this affects spectral distribution.

It has been found, however, that mechanical resonance effects still remain, and are most apparent in the time intervals immediately following the jump interval, before the natural or electrical feedback damping takes effect. The effect of the mechanical resonance in the interval immediately following a track jump is to superimpose upon the deflection due to the electrical driving function a further deflection at the natural mechanical resonant frequency or frequencies of the system. FIG. 6b illustrates a 720 Hz dither-frequency sinusoidal signal 620 as applied to a bimorph having a mechanical resonance at 1200 Hz. Signal 620 also represents the output signal which would be derived from a strain gauge such as 16 associated with a bimorph deflecting linearly in response to a sine-wave input drive signal. Square-wave 615 of FIG. 6a represents the limited square-wave output signal of zero-crossing detector 38 in response to a 720 Hz undistorted sinusoidal signal such as 620.

In the time immediately after a jump signal is applied to the bimorph, the mechanical response of the bimorph and its associated elements includes a damped sinusoidal component at the natural mechanical resonance frequency. Such a damped sinusoid is illustrated as 622 in FIG. 6c. This component is superimposed upon the response attributable to the driving function, which corresponds with waveform 620. The actual mechanical response of the bimorph and its associated elements as measured by a strain gauge is illustrated by waveform 624 of FIG. 6d, which is the sum of waveforms 620 and 622. Comparison of strain-gauge output signal 624 with driving function 620 reveals that the strain-gauge signal is most distorted near time $t_0$, which is the time of the end of the jump interval. As the resonance represented by 622 dies down, the strain-gauge signal 624 closely approximates the driving function 620. In the interval illustrated as $t_0$–$t_{12}$, however, the zero crossings of sum waveforms 624 differ from those of the driving function. For example, sum waveform 624 has a zero crossing at time $t_2$ earlier than time $t_4$, which would be the correct zero-crossing time but for the mechanical resonance. A zero-crossing of driving function 620 at time $t_6$ is close to the time $t_8$ of the corresponding zero-crossing of sum waveform 624. The difference between zero-crossings near times $t_{10}$ and $t_{12}$ is again large. Such changes in the zero-crossings of the output signal of the strain gauge immediately following the jump distort the clock signal applied to synchronous detector 34 during the interval following the jump, before the resonance is damped. The distorted clock signal in turn causes an erroneous error signal to be generated by synchronous detection of the FM envelope information. The erroneous error signal is propagated through the feedback path and adversely affects operation, and in severe cases may result in unstable operation or AST oscillation.

SUMMARY OF THE INVENTION

A dithered automatic scan tracking system for a videotape playback machine includes a bimorph which with its associated load has a mechanical resonance. In special-effects operating modes, the jump or reset signal which drives the bimorph at the end of its scan to position the playback transducer for the next track excites the mechanical resonance, which causes incorrect demodulation of the detected FM envelope and therefore causes generation of an incorrect AST loop error signal until the excited resonance dies away. A gated phase-lock loop is coupled to the bimorph position sensor and produces clock signals for control of the demodulation of the detected FM envelope. The gate decouples the position sensor from the phase-lock loop during recurrent intervals including those intervals during which the mechanical resonance is excited. This allows generation of a correct error signal immediately after the jump and reduces mistracking.

DESCRIPTION OF THE INVENTION

Figure 1:
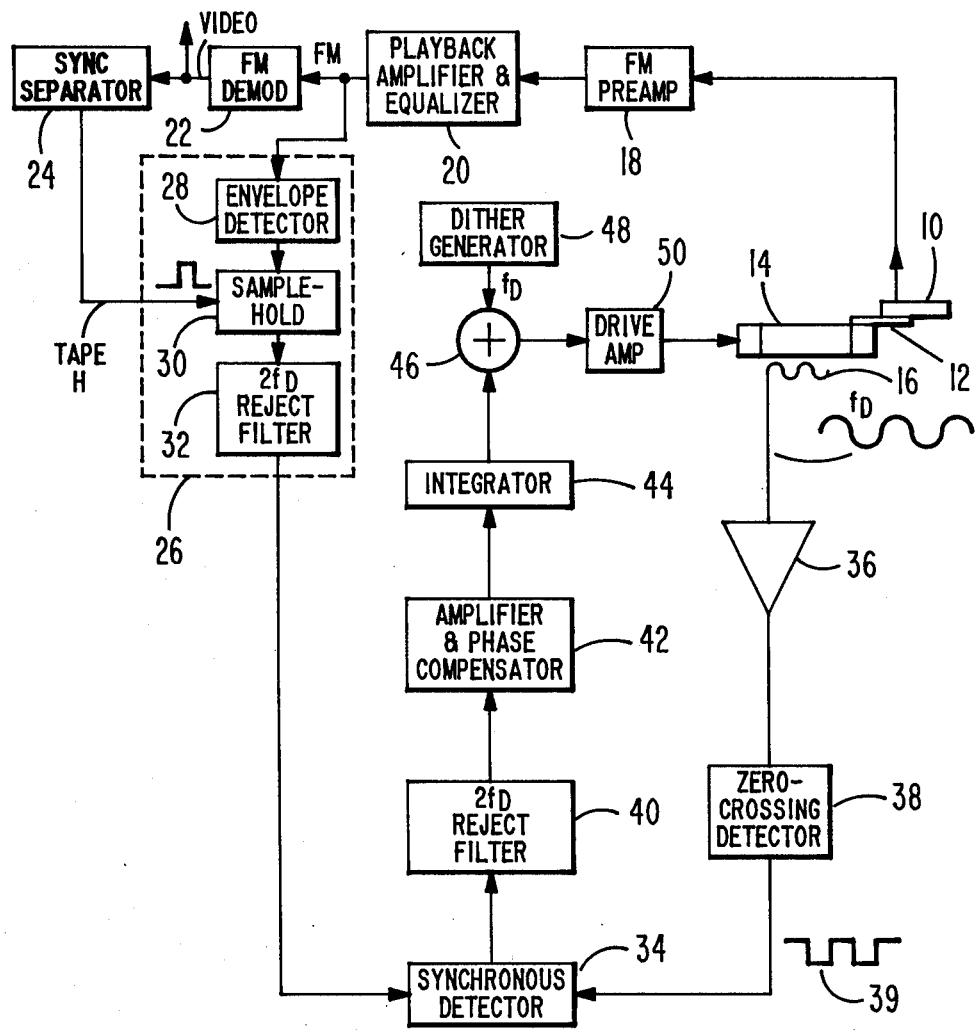
FIG. 1 is a block diagram of a portion of a video tape playback machine including a prior art automatic scan tracking arrangement.
Figures 2A, 2B, 2C:
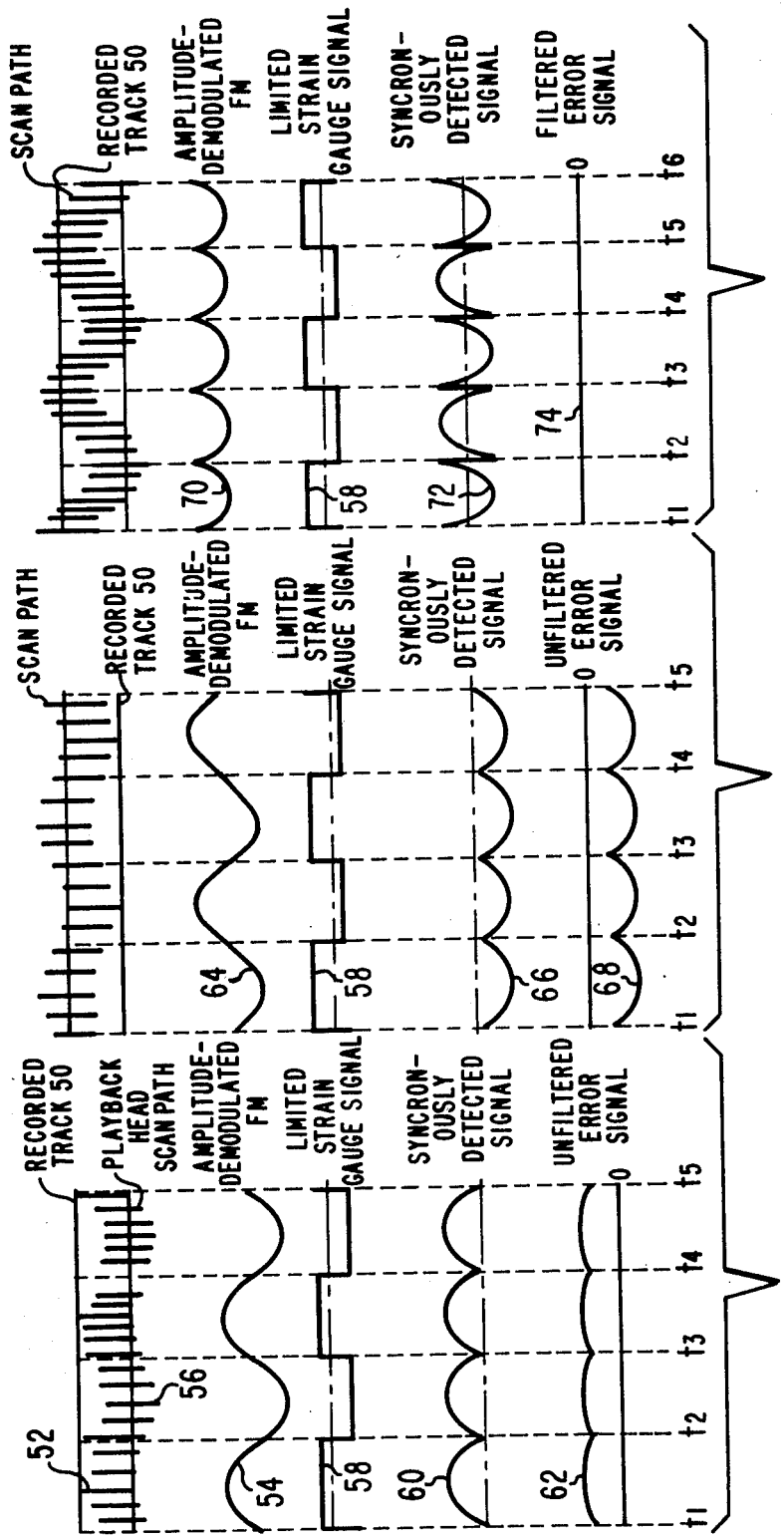
FIGS. 2a–2c illustrate various signal voltages occurring in the arrangement of FIG. 1 under different tracking conditions.
Figure 3A:
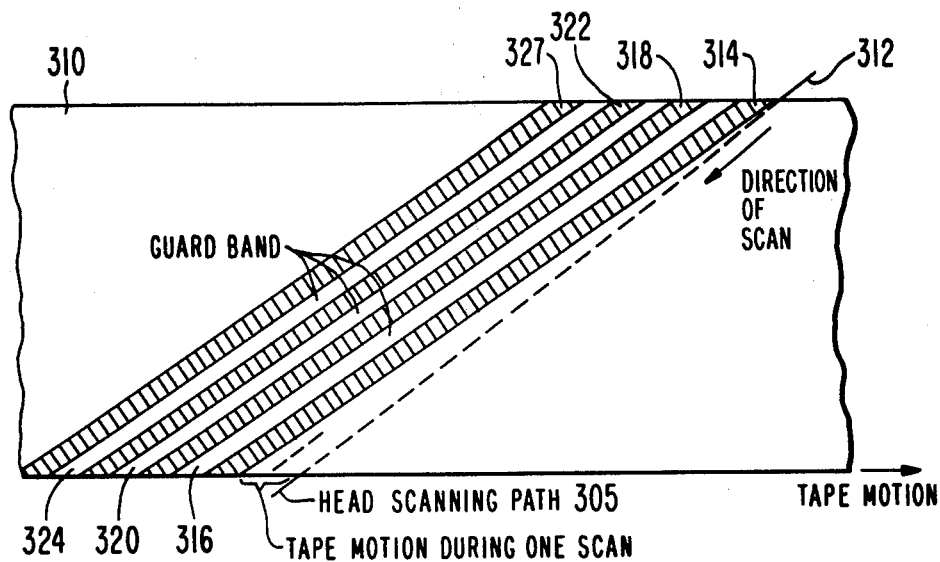
FIGS. 3a–3b illustrate the effect of tape motion on the position of the recorded tracks relative to the scanning head.
Figure 3B:
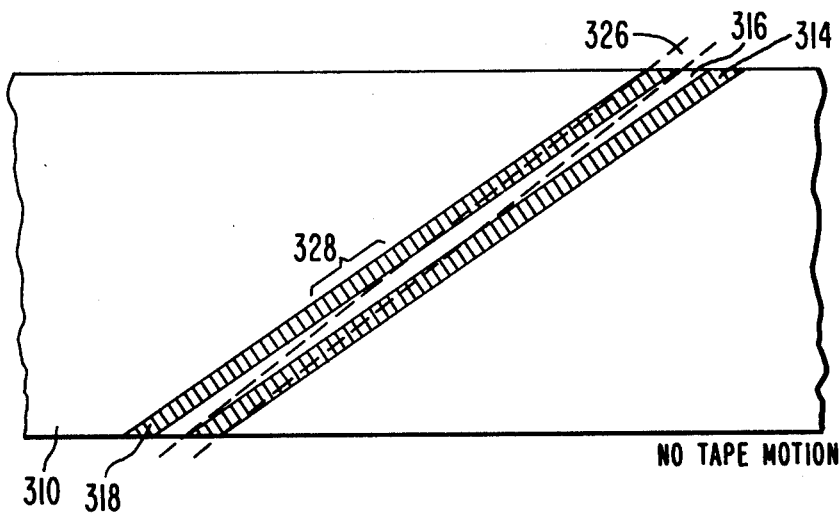
Figure 4:
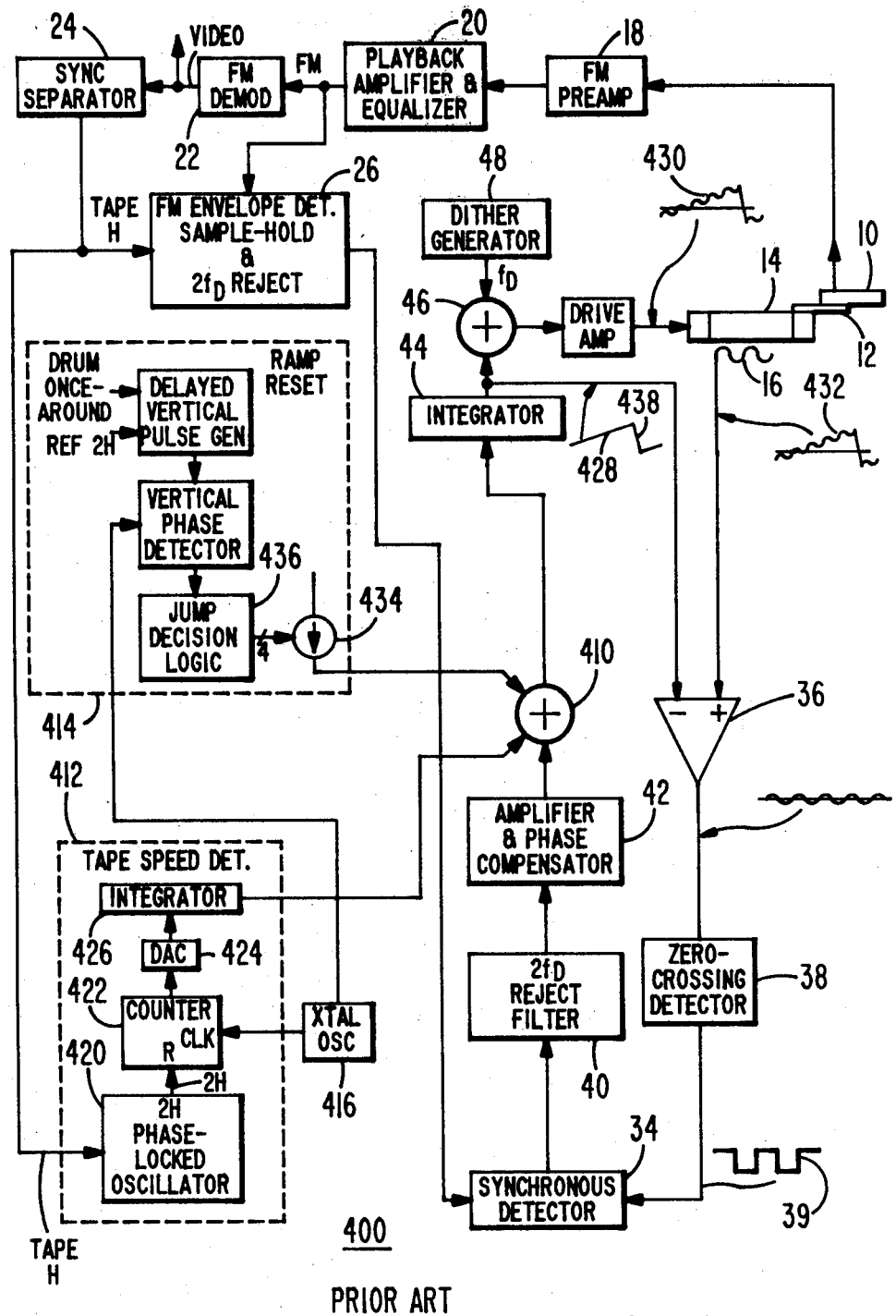
FIG. 4 is a block diagram of a prior art video tape playback arrangement adapted for playing back tapes at various tape speeds.
Figure 5:
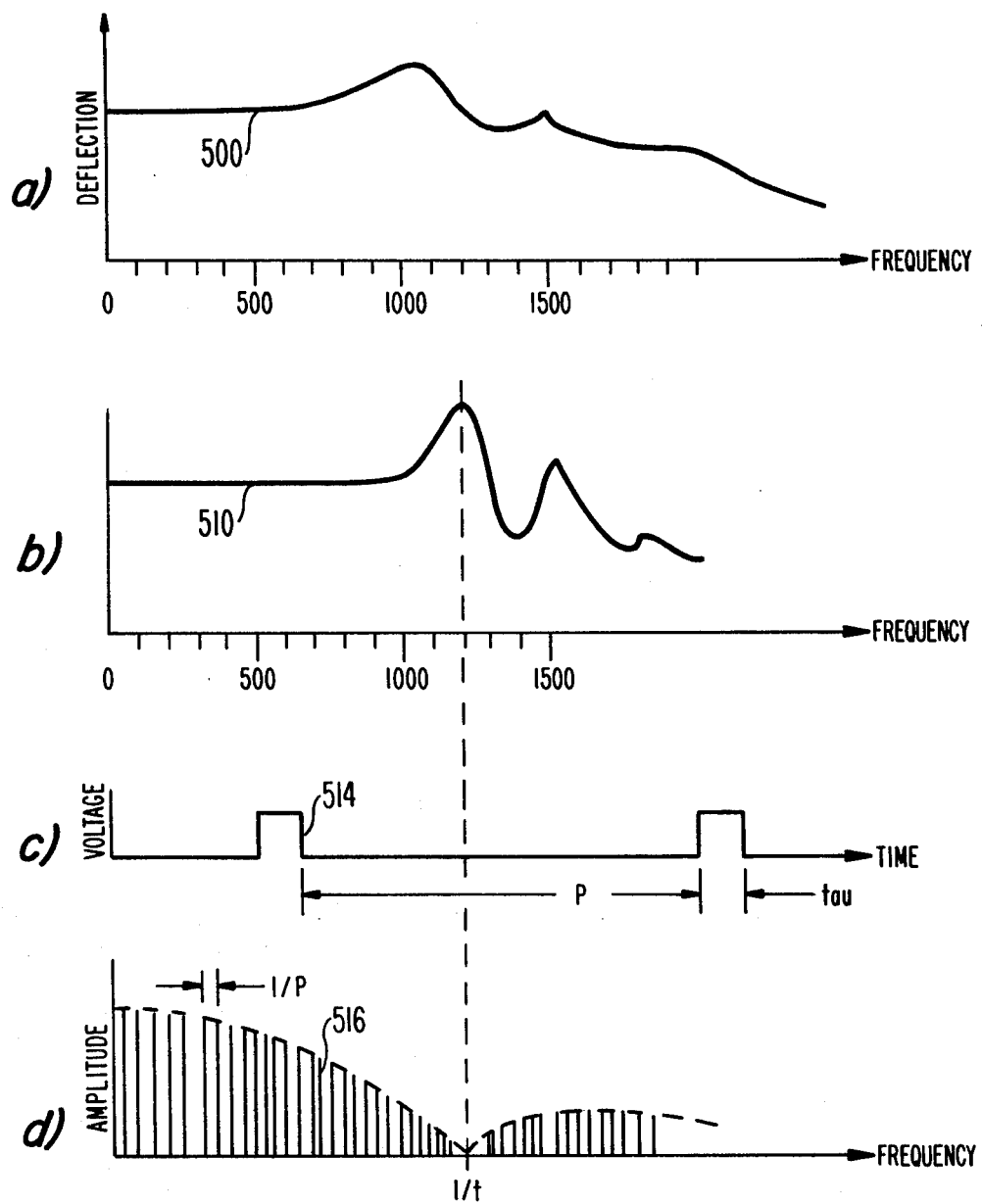
FIGS. 5a–5d illustrates amplitude frequency response plots of various bimorphs, pulse timing diagrams and spectrum plots aiding in understanding the problem to which the invention is directed.
Figure 6:
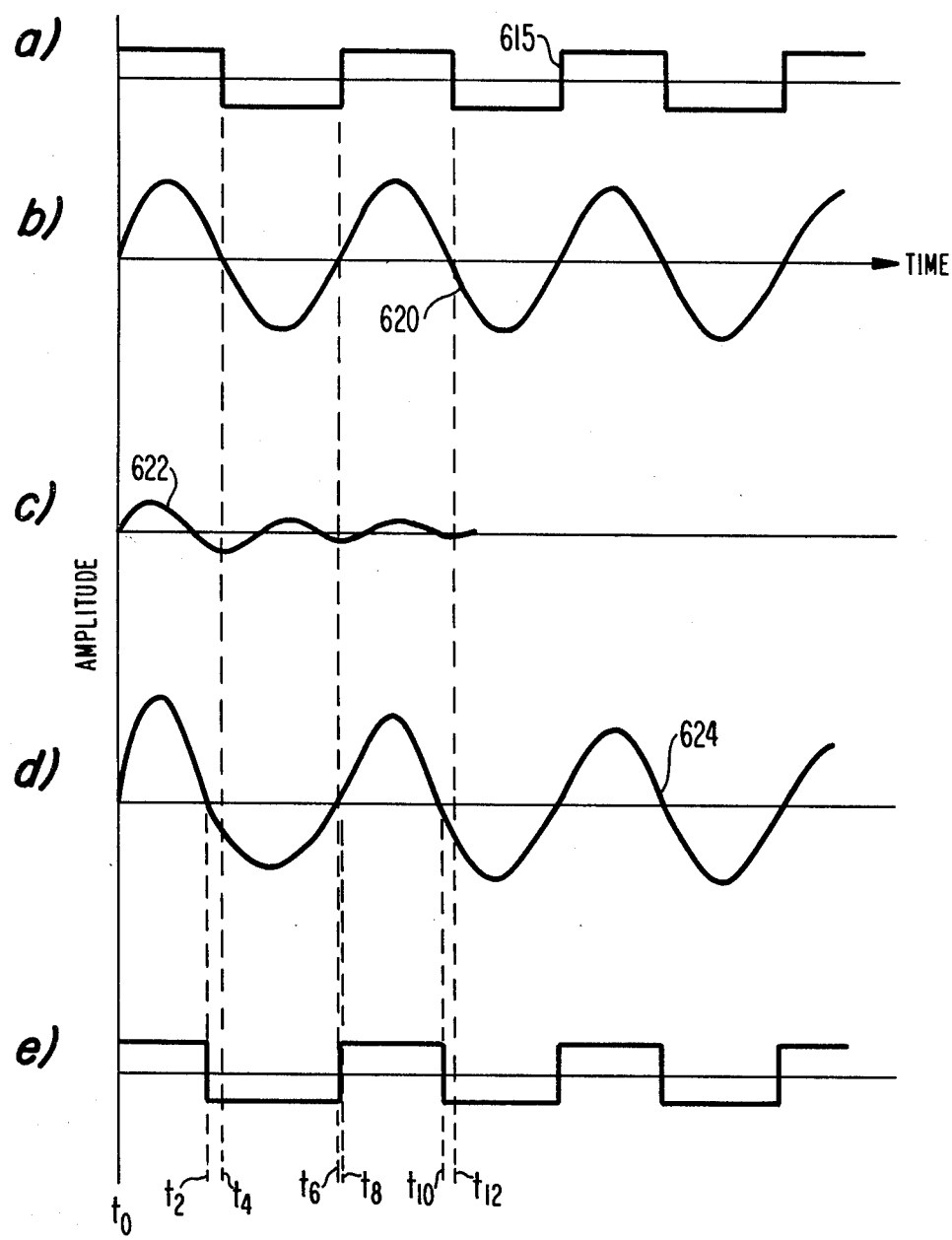
FIGS. 6a–6e illustrates amplitude-time plots of various signals occurring during operation of the system of FIG. 4.
Figure 7:
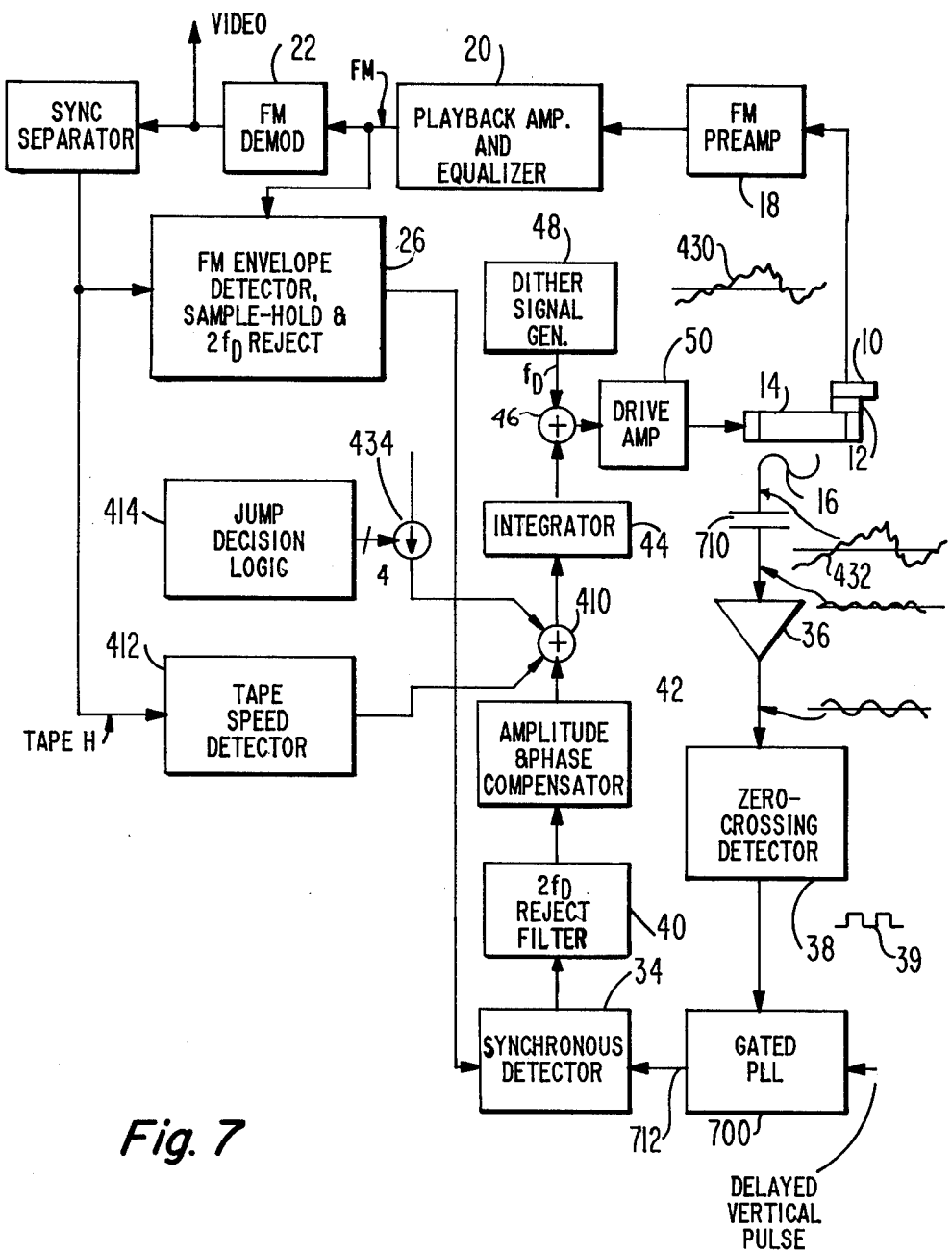
FIG. 7 is a block diagram of an automatic scan system according to the invention.

Those elements of FIG. 7 corresponding with elements of FIG. 4 are designated by the same reference numbers. In FIG. 7, strain gauge 16 is ac-coupled to strain-gauge amplifier 36 by a symbolic capacitor 710. Capacitor 710 allows the dither-frequency component of the strain-gauge signal to be applied to the input terminals of amplifier 36, but blocks low-frequency components such as the ramp. Depending upon the actual frequencies being used, a multielement lowpass filter may be necessary. Since the ramp component does not reach amplifier 36, there is no need to couple a ramp signal from the output of integrator 44 to the inverting input terminal of amplifier 36. The amplified dither signal is applied to zero-crossing detector 38, which generates square waves illustrated as 39 in-phase with the strain gauge signal. Square-waves 39 are applied to the input terminal of a gated phase-lock loop 700, which includes a phase-lock loop for generating at its output terminal 712 a continuous stream of square-waves phase-locked to that portion of limited strain-gauge signal 39 which is considered to be unaffected by mechanical resonances of bimorph 14. Timing of the gating is controlled by delayed vertical pulses, which are derived from a transducer associated with the headwheel for producing a once-around pulse once during each revolution of the playback head. Because of the position of this once-around transducer relative to the playback head or transducer, the once-around pulse occurs about 120° of rotation before the playback head crosses the gap between scans. The once-around pulse is delayed by a time corresponding to about 120° of rotation to produce the delayed vertical pulse, which is therefore indicative of the end of one scan by the playback transducer and the beginning of the next scan. The dither-frequency generator is phase-locked to the 12th harmonic of the 60 Hz delayed vertical pulse, and therefore includes exactly 12 cycles during one rotation of the headwheel.

The "clean" portion of the limited strain-gauge signal at 720 Hz is considered to be that portion excluding the first three dither cycles following the delayed vertical pulse, although different amounts of vibration damping may make it advisable to exclude more or less than 3 cycles. With 3 cycles excluded, about 8 dither cycles are available for phase-locking of the continuous clock in gated PLL 700.

Figure 8:
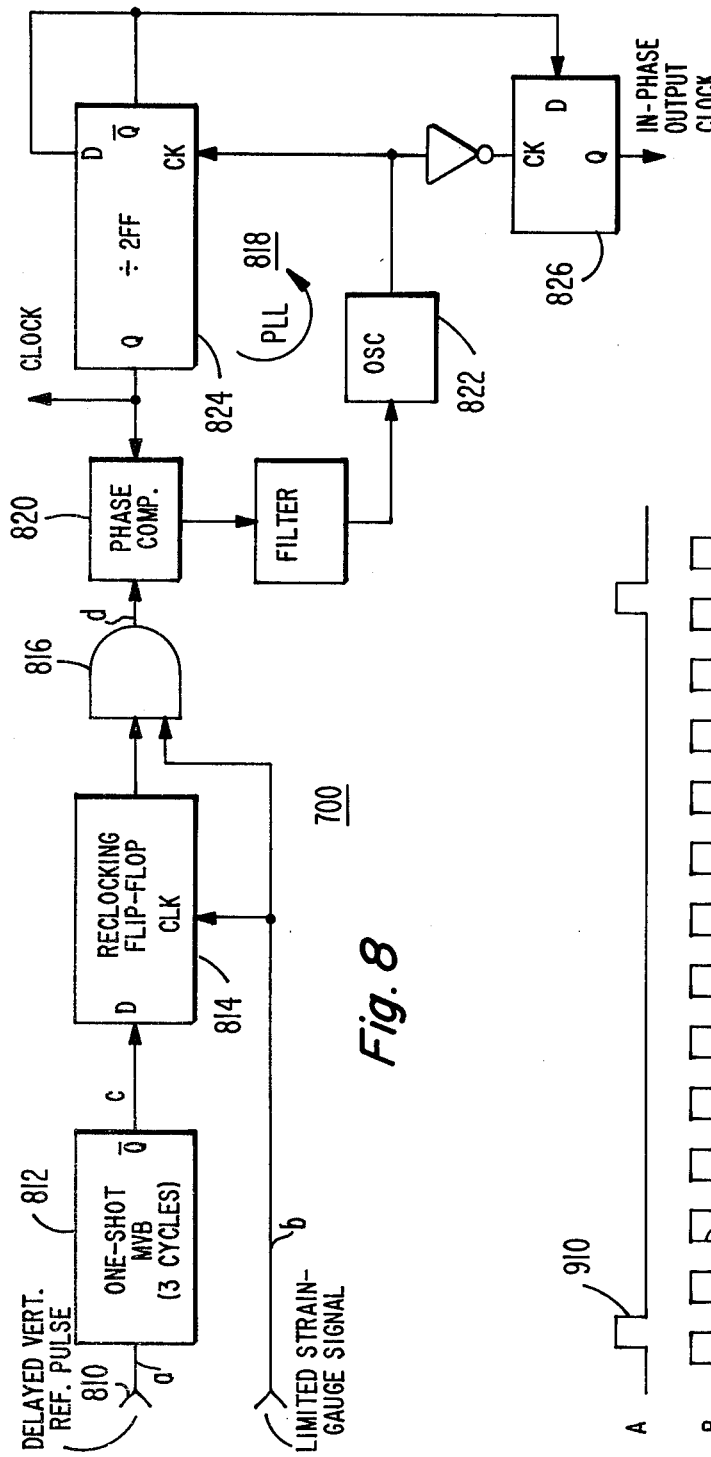
FIG. 8 is a detailed block diagram of a portion of the arrangement of FIG. 7.
Figure 9:
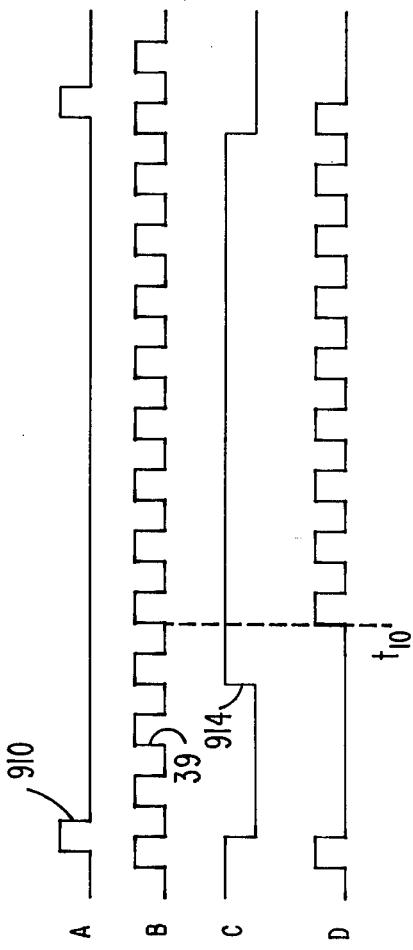
FIG. 9 is a timing diagram aiding in understanding the invention.

FIG. 8 illustrates details of the operation of gated PLL 700. Delayed vertical reference pulses illustrated as 910 in FIG. 9a are applied to an input terminal 810 coupled by a conductor a to the control input terminal of a one-shot multivibrator (MVB) 812 having a time constant equivalent to the duration of about 3 dither pulses. The output signal of MVB 812 on conductor c, illustrated as 914 in FIG. 9c, is applied to the D input of a flip-flop 814. At time $t_{10}$, the HIGH output of MVB 812 on conductor c is clocked to an input terminal of AND 816, thereby allowing the clock pulse 39 occurring after time $t_{10}$ to pass to an input terminal of a phase comparator 820 of a phase-lock loop (PLL) 818. The loop oscillator 822 operates at double the clock rate, and its output signal is counted down by a ÷2 counter 824 for application to the other input terminal of phase comparator 820 and for use as a clock pulse. The double-frequency clock operation allows an output signal phase-shifted by 90° relative to the Q output of divider 824 to be readily derived if desired by coupling together the $\overline{Q}$ and D terminals of ÷2 FF 824 and coupling them to the D input of a further FF 826, and applying the oscillator output signal to the clock (ck) input of FF 826 by way of an inverter 828. The above arrangement permits the removal of a 90° phase shift produced by the type of detector used and thus to create an output at Q of FF 826 in-phase to the limited strain gauge.

What is claimed is:

1. An improved automatic scan tracking system for a videotape playback apparatus comprising:

a headwheel;

tape transport means coupled to said headwheel for transporting about said headwheel magnetic tape prerecorded with slant-scanned tracks;

playback transducer means adapted for rotation coaxial with said headwheel, said transducers following a path approximately parallel with said prerecorded tracks;

controllable playback transducer mounting means coupled to said playback transducer means and adapted for moving said playback transducer means transversely relative to said prerecorded tracks under the control of an error signal, said controllable mounting means having a mechanical resonant frequency;

dither signal generating means coupled to said controllable mounting means for applying a dither-signal to said controllable mounting means for causing recurrent lateral excursions of said transducer relative to said recorded tracks;

transducer tracking sensing means coupled to said playback transducer means for generating a tracking signal representative of the degree of tracking, said tracking signal including a component related to said dither signal;

error signal generating means coupled to said transducer tracking sensing means and to said controllable mounting means for comparing said tracking signal with a clock signal applied to a clock signal input terminal and for generating an error signal in response to said tracking signal and said clock signal and for coupling said error signal to said controllable mounting means for control of the position of said transducer means;

transducer position sensing means coupled to said controllable playback transducer mounting means for producing a position signal representative of the transverse position of said playback transducer means;

first coupling means coupled to said transducer position sensing means and to the clock signal input terminal of said error signal generating means for generating said clock signal in response to said position signal for closing a degenerative feedback loop for urging said playback transducer means towards a particular tracking relation with said prerecorded tracks; and jump signal generating means coupled to said controllable playback transducer mounting means for periodically applying a jump signal thereto for causing a relatively rapid change in the position of said playback transducer mounting means, whereby said controllable transducer responds with motion having a component at said resonant frequency, which causes said position signal to include unwanted components attributable to said mechanical resonance during recurrent first intervals which thereby perturb said clock signal and said error signal, which creates tracking error;

wherein the improvement lies in that said first coupling means comprises a controllable continuous clock pulse generator, the output terminal of which is coupled to said clock input terminal of said error signal generating means;

phasing means coupled to the control input terminal of said continuous clock pulse generator for controlling said continuous clock pulses to be in a particular phase relation with signals applied to an input terminal of said phasing means; and controllable gating means coupled to said input terminal of said phasing means and to said transducer position sensing means for coupling said position signals to said input terminal of said phasing means during times not including said recurrent first intervals for thereby preventing said unwanted components from perturbing said clock signal and said error signal and thereby reducing mistracking.

* * * * *